US000001984H

(19) United States

(12) Statutory Invention Registration (10) Reg. No.: US H1984 H

Salama et al. (43) Published: Aug. 7, 2001

(54) ORTHODONTIC ABUTMENT

(75) Inventors: Maurice A. Salama, Marietta, GA (US); Henry Salama, Laverock, PA (US); Richard J. Lazzara, Lake Worth; Randy E. Goodman, West Palm Beach, both of FL (US)

(73) Assignee: Implant Innovations, Inc., Palm Beach Gardens, FL (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/852,897

(22) Filed: May 8, 1997

Related U.S. Application Data

(60) Provisional application No. 60/017,523, filed on May 10, 1996.

(51) Int. Cl.[7] ..... A61C 8/00

(52) U.S. Cl. ..... 433/173; 433/24

(58) Field of Search ..... 433/8, 23, 24, 433/173, 174, 180

(56) References Cited

U.S. PATENT DOCUMENTS

| | | | | |
|---|---|---|---|---|
| 2,836,890 | * | 6/1958 | Silvis | 433/174 |
| 3,028,671 | | 4/1962 | Berger . | |
| 3,127,677 | | 4/1964 | Schachter . | |

(List continued on next page.)

FOREIGN PATENT DOCUMENTS

| | | | | |
|---|---|---|---|---|
| 2 425 842 | | 1/1980 | (FR) . | |
| 9414388 | * | 7/1994 | (WO) | 433/174 |
| WO 96/12451 | | 5/1996 | (WO) . | |
| 96/19946 | | 7/1996 | (WO) . | |

OTHER PUBLICATIONS

Salama, DMD, Henry, et al, The Role of Orthodontic Extrusive Remodeling in the Enhancement of Soft and Hard Tissue Profiles Prior to Implant Placement: A Systematic Approach to the Management of Extraction Site Defects, The International Journal of Periodontics & Restorative Dentistry, vol. 13, No. 4, 1993.

(List continued on next page.)

*Primary Examiner*—Harold J. Tudor

(74) *Attorney, Agent, or Firm*—Daniel J. Burnham; Jenkins & Gilchrist

(57) ABSTRACT

An orthodontic abutment for attachment to a dental implant that is embedded living jawbone having overlying gingiva is set forth. The implant has a gingival surface exposed through the overlying gingiva. The orthodontic abutment is capable of receiving an orthodontic component. The orthodontic abutment comprises a generally cylindrical main body having a lower end for engaging the gingival surface of the implant and a supragingival end opposing the lower end for protruding above the overlying gingiva. The main body has an outer surface between the lower end and the supragingival end. The outer surface includes a roughened portion to which the orthodontic component is to be attached and a gingival portion for contacting the overlying gingiva. The gingival portion extends from the lower end for about 3 mm. The roughened portion typically extends 360° around a central axis of the main body and is preferably adjacent to the supragingival end.

42 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | |
|---|---|---|---|---|
| 3,452,436 | | 7/1969 | DeWoskin . | |
| 4,197,643 | | 4/1980 | Burstone et al. . | |
| 4,522,596 | | 6/1985 | Ashkinazy . | |
| 4,738,062 | | 4/1988 | Dickey . | |
| 4,988,292 | | 1/1991 | Rosen . | |
| 5,015,186 | * | 5/1991 | Detsch | 433/8 |
| 5,066,224 | | 11/1991 | Block et al. . | |
| 5,071,345 | | 12/1991 | Rosen . | |
| 5,082,442 | | 1/1992 | Rosen . | |
| 5,141,435 | * | 8/1992 | Lillard | 433/176 |
| 5,232,364 | | 8/1993 | Rosen . | |
| 5,407,359 | | 4/1995 | Balfour et al. . | |
| 5,447,435 | * | 9/1995 | Brodbeck | 433/173 |
| 5,607,480 | * | 3/1997 | Beaty | 623/16 |
| 5,613,849 | * | 3/1997 | Tanaka et al. | 433/8 |

OTHER PUBLICATIONS

Douglass et al., "Dental Implants Used as Orthodontic Anchorage", *J. Oral Implantology* vol. XIII No. 1, 1987 28–35.

Shapiro et al., "Uses of Implants in Orthodontics", *Dental Clinics of North America* vol. 32 No. 3, Jul. 1988, 539–549.

Kraut et al., "Use of Endosteal Implants as Orthodontic Anchorage", *Compend Contin Educ Dent* vol. IX, No. 10, Nov./Dec. 1988, 796–801.

Van Noort, Richard. *Introduction to Dental Materials* Mosby/Times Mirror Internation Pub ltd., pp. 61–68, ©1994.*

* cited by examiner

ORTHODONTIC ABUTMENT

CROSS REFERENCES TO RELATED APPLICATIONS

This is a complete application claiming the benefit of copending provisional patent application Ser. No. 60/017,523, filed May 10, 1996.

FIELD OF THE INVENTION

This invention relates in general to the dental field of orthodontics and, more particularly, to an abutment for orthodontic anchorage to a dental implant which has osseointegrated with bone in a patient's mouth.

BACKGROUND OF THE INVENTION

In one class of systems used in orthodontic practice, arch-wires cooperating with brackets fixed to buccal surfaces of teeth are used to adjust the relative positions of teeth in a dental arch with appropriate forces applied over time to individual teeth in the arch. These wires are anchored at their ends to tubes, hooks and the like which are affixed to the patient's molars or other suitable teeth. Elastics and ligature threads are also used in orthodontics and these, too, cooperate with traction hooks and buttons affixed to the surfaces of a patient's teeth.

In cases where the patient is edentulous at the site where orthodontic anchorage is desired, an artificial root, notably an endosseous implant, with a suitable abutment attached, may provide support for orthodontic anchorage. It is known to attach molar bands to temporary crowns affixed to dental implants. The present invention discloses a new abutment to which molar bands and other orthodontic components may be directly attached, eliminating the need to construct a temporary crown.

SUMMARY OF THE INVENTION

A dental implant in the class of endosseous implants consists essentially of an elongated body implanted in the patient's mandible or maxillary and a socket for receiving a fitting or fittings which fix a prosthodontic restoration on the elongated body. Commonly, the socket is an internally-threaded bore. The restoration is then fixed to the implanted body with a screw threaded into the bore. Other forms of dental implants are in use and a wide variety of materials are used to make these implants. This invention is disclosed in connection with a typical endosseous implant as currently known to be the best mode of practice. It will be understood that the invention is not limited to the details of the illustrative embodiments of that implant. To the contrary, the invention is intended for use with any and all substitutes for natural root structures that are capable of providing the required anchorage, whether presently known or made available in the future.

Generally, according to the invention, an abutment (or post) which may be tubular in shape is fixed endwise to the implant so as to extend supragingivally through the overlying gingiva or mucosa. The tubular shape produces an internal bore in the abutment. The abutment is fastened to the implant with a screw that passes through the bore from the supragingival end to a shoulder within the bore on which the head of the screw rests.

The abutment is provided on its outer surface with a roughened surface. In a preferred embodiment, the roughened surface begins approximately 3 mm from the lower end which is seated on the implant so that there is about 3 mm of smooth external surface confronting the overlying gingiva. Because the roughened surface begins above the gingiva, the chances of the abutment irritating the gingiva are reduced. This roughened surface may extend in a coronal or supragingival direction for approximately 5 mm. In a preferred embodiment, it extends to the supragingival end of the abutment which opposes the lower end seated on the implant The roughened surface may extend all around the abutment. Alternatively, the roughened surface may extend approximately 180 degrees around the abutment so long as the abutment can be oriented around its longitudinal axis to place the roughened surface at the appropriate location (i.e. typically buccal confronting location) desired by the orthodontist. Using the available "hex" interlock that is in wide use in systems employing endosseous implants, the abutment can be fixed on the implant in any axial orientation desired.

The roughened surface on the abutment should be sufficiently rough to allow direct bonding of an orthodontic band or an orthodontic component to the material of the abutment. This material is usually titanium or a dilute alloy of titanium as presently in widespread use in the practice of dental implantology.

This invention will be described in greater detail with reference to the accompanying drawings illustrating exemplary embodiments of the invention.

DETAILED DESCRIPTION OF THE DRAWINGS

Figure 1:
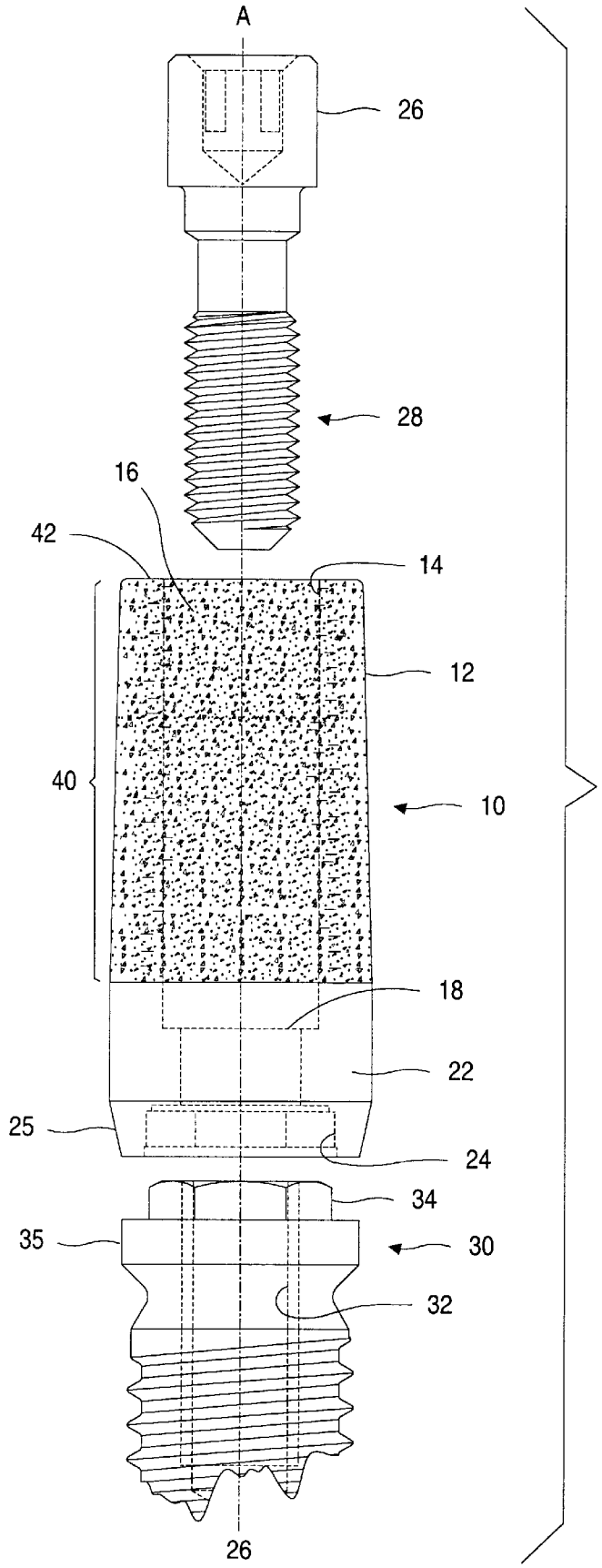
FIG. 1 is an exploded side view of a dental implant, an abutment and an attaching screw.

In FIG. 1, an abutment 10 is generally tubular in form, having an outer generally cylindrical surface 12 and an inner surface 14 surrounding a hollow space which is commonly referred to as a bore 16. The bore 16 narrows to a smaller diameter near a lower portion 22 of the abutment 10 and provides a shoulder 18. Below the shoulder 18 is a nonrotational socket 24 which is shown as hexagonal.

To attach the abutment 10 to an implant 30, a head 26 of a screw 28 is engaged by a tool to screw the screw 28 into a receiving bore 32 of the implant 30. The implant 30 and the abutment 10 are also fitted with an interlocking hexagonal boss 34 and socket 24 of known form for non-rotationally connecting the abutment 10 to the implant 30 in a fashion that permits the abutment 10 to be fixed in one of several orientations around its longitudinal axis A—A on the implant 30. A lowermost end 25 of the abutment 10 is tapered down in diameter to match the diameter of an uppermost, gingival end 35 of the implant 30 to provide a smooth transition from the implant 30 to the abutment 10 in the region of the abutment 10 that is under the gingiva (62 in FIG. 4).

A portion 40 on the outer surface 12 beginning approximately 3 mm from the lower-most end 25 and extending to or toward the coronal or supragingival end 42 of the abutment 10 is roughened surrounding the abutment 10. This roughened portion 40 of the surface 12 can be roughened in any of several known ways, used singularly or in combination (e.g. grit-blasting, acid etching, plasma coating).

In one preferred embodiment which has been successful in producing a roughened portion 40 capable of bonding an orthodontic component thereon, a plasma-coating technique in which the surface 12 is first grit-blasted and then coated from a plasma of chemically-pure titanium particles is utilized. A mask can be used to prevent particles from impacting segments of the surface 12 outside of the portions of the surface 12 where the particles are to be deposited. One type of grit-blasting methodology is disclosed in U.S. Pat. No. 5,607,480 which is herein incorporated by reference. The size of the particles should be greater than about −60+100, and preferably about −80+200. A thickness of the plasma layer in this technique is in the range of approximately 0.004 inch to approximately 0.006 inch.

The bonding strength of the particles that is required to remove the plasma-coated layer from the body of abutment is typically in the range of about 7,000 psi to 10,000 psi. The roughness produced by the particles gives the roughened portion 40 of the surface 12 a feel like fine sandpaper.

The roughness needed for such bonding is greater than the roughness that is suitable for osseointegration of the implant in living bone. A roughness value in the range of about 700 to about 900 $\mu$-inch RMS or greater produces acceptable results.

Figure 2B:
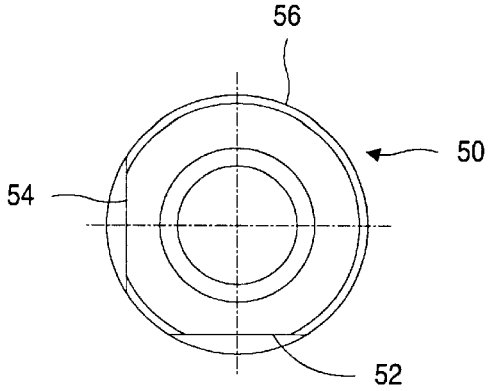
FIG. 2B is a top view of FIG. 2A.
Figure 3B:
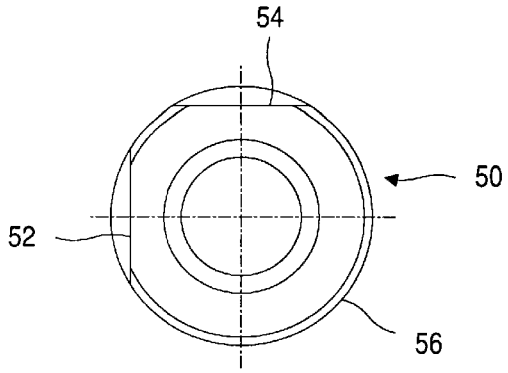
FIG. 3B is a top view of FIG. 3A.
Figure 2A:
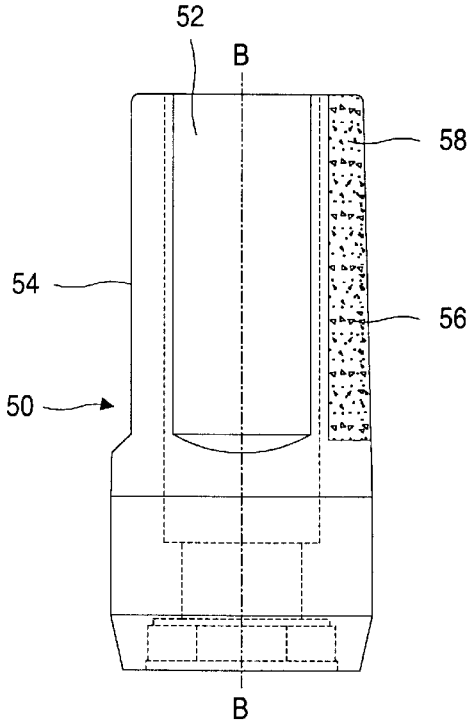
FIG. 2A is a side view of another embodiment of the abutment of the invention.
Figure 3A:
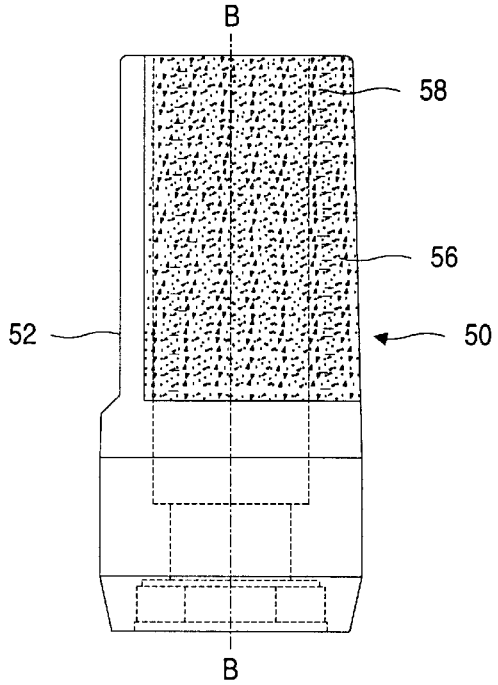
FIG. 3A is a side view of the abutment in FIG. 2A, turned 90 degrees clockwise around its longitudinal axis.
Figure 2C:
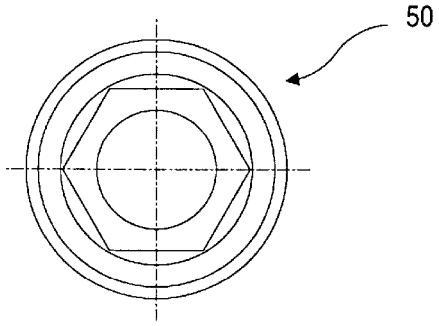
FIG. 2C is a bottom view of FIG. 2A.

FIGS. 2A and 3A are two views of a second abutment 50 according to the invention which has two flattened sides 52 and 54. The roughened portion 56 of the outer surface 58 extends less than all the way around the abutment 10 and does not include the flattened sides 52 and 54. The roughened portion 56 extends at least 90 degrees around the abutment 50 and preferably extends approximately 180 degrees around the abutment 50. In all other respects, the abutment 50 of FIGS. 2A and 3A is similar to the abutment 10 in FIG. 1. As is disclosed in connection with FIG. 1, the abutment 50 of FIGS. 2A and 3A can be fixed on the implant (not shown) in any of several desired angular positions around its longitudinal axis B—B to locate the roughened portion 56 at whatever location is desired by the orthodontist (typically the buccal confronting side). FIGS. 2B and 2C illustrate the abutment 50 in top views.

FIG. 2C illustrates the bottom view of the abutment 50 which is the same as the bottom view of the abutment 10. The hexagonal socket which mates with the hexagonal boss 34 (FIG. 1) can be readily seen.

Figure 4:
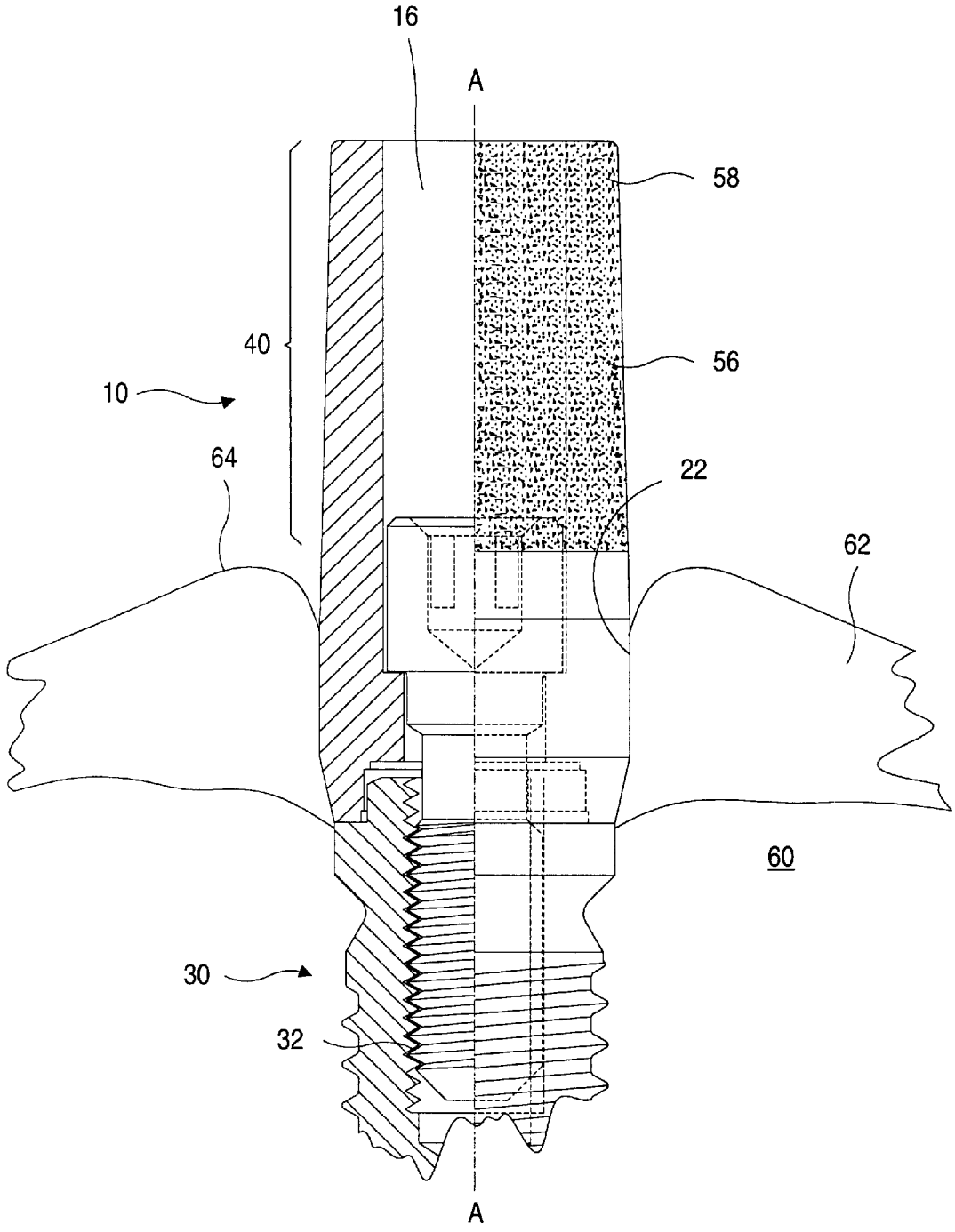
FIG. 4 shows the components of FIG. 1 assembled in a site in the patient's mouth.

In FIG. 4, the abutment 10, implant screw 28 and implant 30 of FIG. 1 are shown assembled. The implant 30 is located in bone 60 with overlying gingival 62 surrounding the lower portion 22 of the abutment 10. The roughened portion 40 begins above the gingival surface 64 of the overlying gingival 62. Thus, the lower portion 22 can be considered a gingival portion since it is the surface which contacts the overlying gingiva 62. This lower portion 22 is preferably smooth so that the overlying gingiva 62 in contact therewith is not irritated by a rough surface.

Figure 5B:
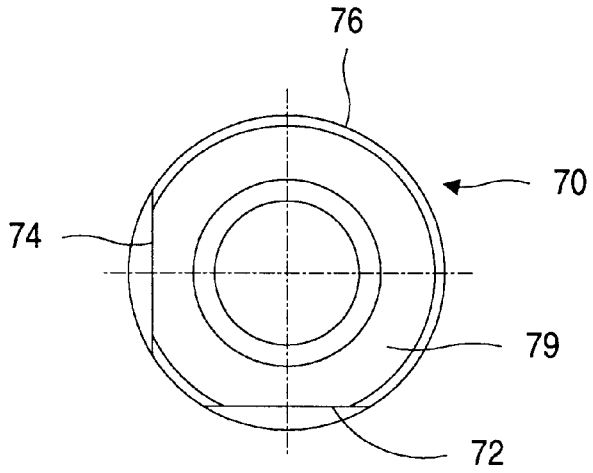
FIGS. 5A and 5B illustrate an alternative embodiment in which the roughened portion stops below the supragingival end of the abutment.
Figure 5A:
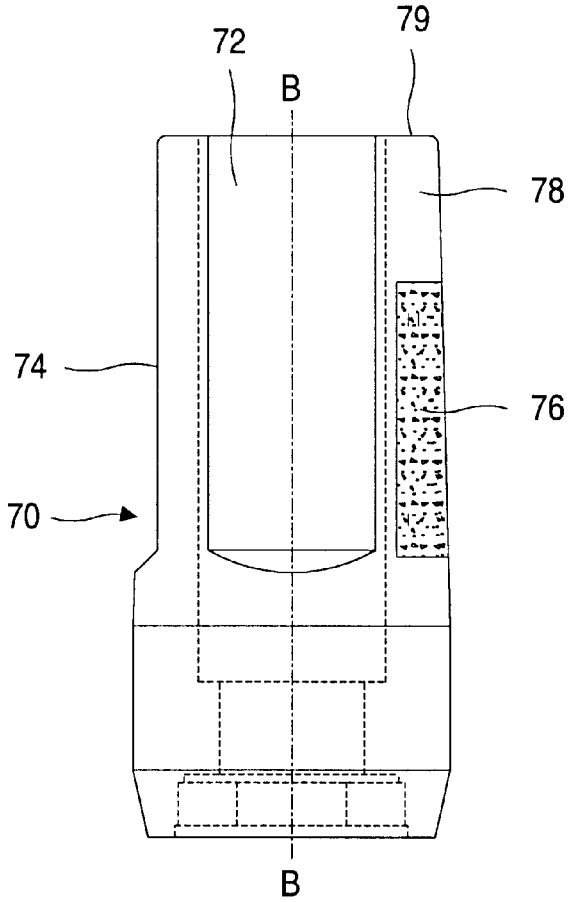

FIGS. 5A and 5B illustrate an alternative embodiment of the present invention.

An abutment 70 includes two flat portions 72 and 74 along its outer surface 78. A roughened portion 76 is located in regions outside of the flat portions 72 and 74. However, the roughened portion 76 is spaced from a supragingival end 79 by a redetermined distance. In other embodiments, it may be useful to provide a flat portion which is roughened through various ways (e.g. grit blast, acid etch, plasma-coating, etc.) so that an orthodontic component can be attached to a flat region as well.

Furthermore, if the orthodontic component includes a band which entirely surrounds the abutment, the band may have a corresponding flat portion or portions to resist the rotation of the band on the abutment. This will require a custom band to match the contour of the abutment. Furthermore, to provide accurate positioning of the orthodontic component in the patient's mouth, this also requires the boss of the implant to be properly aligned during its installation process since the position of the flat or flats (and, therefore, the orthodontic component) is aligned with the socket that mates non-rotationally on the boss of the implant.

Figure 6B:
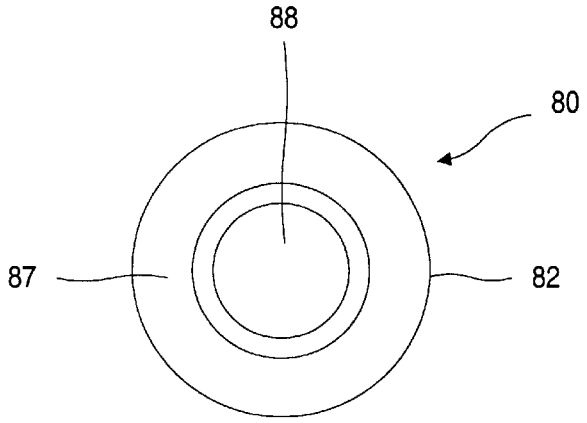
FIG. 6 is a side view of an alternative abutment which is similar to the embodiment of FIG. 1.
Figure 6A:
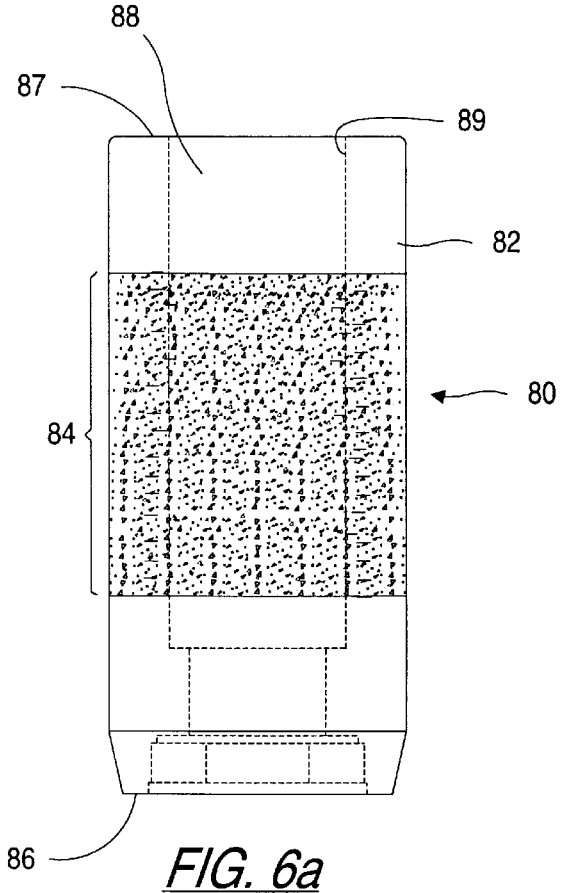

FIGS. 6A and 6B illustrate a generally cylindrical orthodontic abutment 80 similar to abutment 10 in FIG. 1. However the abutment 80 has an outer surface 82 with a roughened portion 84 that begins at an intermediate point between a lower end 86 and a supragingival end 87. Typically, the roughened portion 84 preferably starts at least about 3 mm from the lower end 86. In this embodiment, the roughened portion 84 of the outer surface 82 terminates below the supraginval end 87. A bore 88 for receiving a screw extends through the main body of the abutment 80 and is defined by an inner surface 89.

Figure 7:
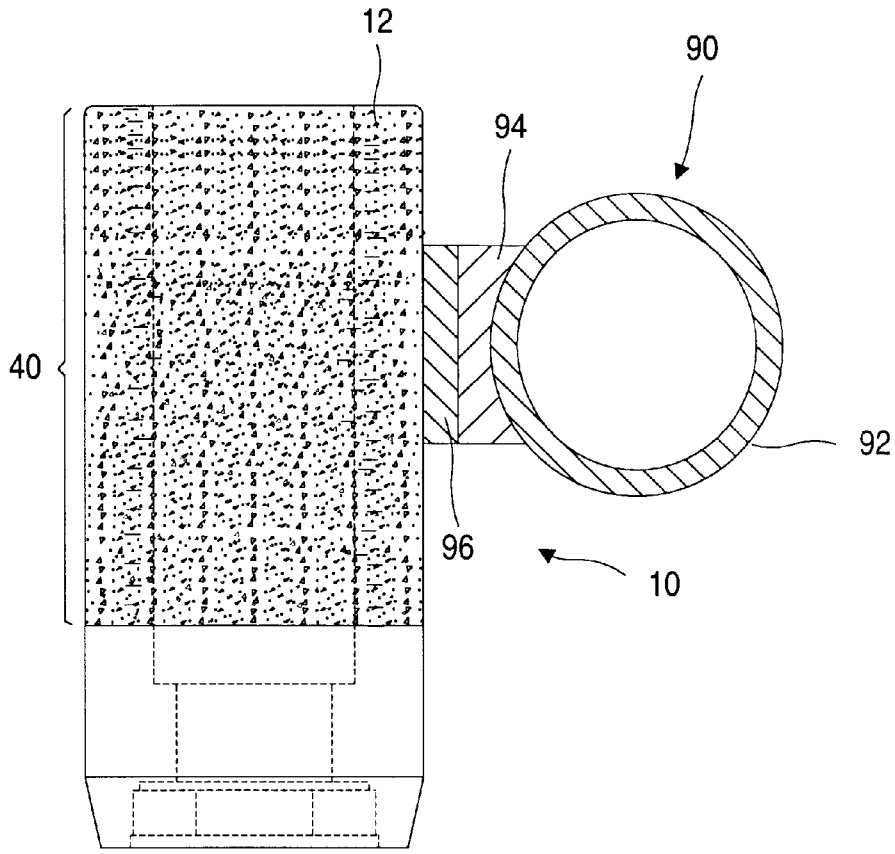
FIG. 7 is a side view of the abutment of FIG. 1 with an orthodontic component attached thereto and shown in cross-section.

FIG. 7 illustrates the abutment 10 of FIG. 1 with an orthodontic component 90 (in cross-section) attached along the roughened portion 40 of the outer surface 12. As shown, the orthodontic component 90 is a molar tube for receiving orthodontic wire. The component 90 includes a cylindrical portion 92 (circular in cross-section) which is attached to a base portion 94. The base portion 94 is bonded directly on the roughened portion 40 by an adhesion material 96. The adhesion material 96 can be one of many kinds of typical materials commonly used to bond orthodontic components to natural tooth. One example is the material known as the Phase II composite from Reliance Orthodontics Inc.

Figure 8:
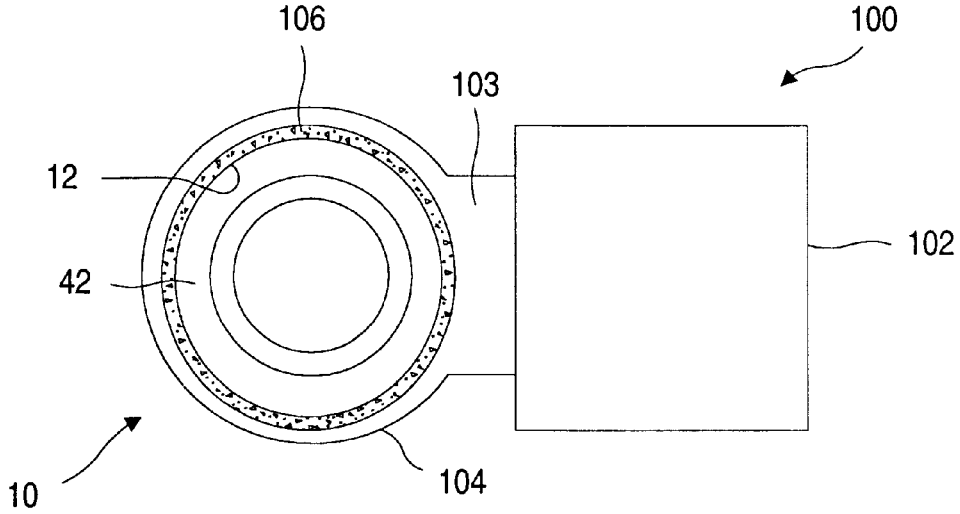
FIG. 8 is a top view of the abutment of FIG. 1 with an orthodontic band attached therearound.

FIG. 8 illustrates the abutment 10 of FIG. 1 in a top view with an alternative orthodontic component 100 being attached thereto below the supraginigival end 42. The orthodontic component 100 includes a cylindrical portion 102 (rectangular from the top view) which is attached to a base portion 103. The base portion 103 is further coupled to a band 104 which surrounds the entire abutment 10. The band 104 is attached to the outer surface 12 of the abutment 10 (at the roughened portion 40 which is not shown) with an adhesion material 106. As stated above, the adhesion material 106 may be one of many types of common materials currently used to attach orthodontic components to natural teeth.

The present invention also contemplates the use of a set of orthondontic abutments provided to the orthodontist. The abutments in the set have varying characteristics such as height, diameter in the roughened portion, or possibly roughness. For example, a set may include abutments having diameters of 4 mm, 5 mm, and 6 mm through the roughened portion. Alternatively, the set may include abutments which have various diameters at their lower ends that mate with the implant so as to accommodate implants of varying widths (e.g. 3.75 mm, 4.25 mm, and 5.0 mm).

Referring again to FIGS. 1, 4, 7 and 8, the abutment 10 is mounted onto an implant 30 which has osseointegrated with the host bone. When the implant 30 is used for restoration purposes, the osseointegration stage is typically followed by a gingiva-healing stage whereby a healing component is placed on the implant 30 and the overlying gingiva is permitted to heal therearound. In the case where the implant 30 is used as the anchorage device for the orthodontic abutment 10, the use of the healing component is not necessary as the gingiva can simply grow around the smooth, lower portion 22 of the abutment 10. However, if desired, a healing abutment, which preferably matches the intra-gingival contour of the lower portion 22 of the abutment 10, may be mounted on the implant 30 before installing the orthodontic abutment 10.

The orthodontic component can be directly bonded to the abutment 10 in the patient's mouth. Alternatively, the abutment 10 can be mounted onto the implant 30 in the patient's mouth, marked for alignment purposes, and removed from the patient's mouth. The orthodontic component can then be attached to the abutment 10 outside the patient's mouth at the marked location and subsequently mounted on the implant 30.

After the abutment 10 has been installed on the implant 30, the bore 16 is filled with a common material (e.g. soft composites) which can be removed at a later time to access the implant screw 28. Furthermore, the orthodontist may decide to remove a portion of the abutment 10 not attached to the orthodontic component to ensure a proper bite. This can be done in the same manner as commonly performed on posts which are coupled to a prosthetic tooth.

Upon completion of the orthodontic therapy, the abutment can be removed and the underlying implant 30 can be used for a conventional restoration. Alternatively, the abutment can be converted for use as an abutment in that restoration which may, for example, be the structure for holding the ceramic material used for the prosthetic tooth. It will be understood that abutments according the invention can be provided with features of abutments intended for use as part of the procedure for making a temporary or permanent restoration. Conversely, the present invention encompasses modifying conventional abutments to endow them with the features of the invention.

While the present invention has been described with reference to one or more preferred embodiments, those skilled in the art will recognize that many changes may be made thereto without departing from the spirit and scope of the present invention which is set forth in the following claims.

What is claimed is:

1. An orthodontic abutment for attachment to a dental implant that is embedded in living jawbone having overlying gingiva, said implant having a gingival surface with a non-round fitting that is accessible through said overlying gingiva, said orthodontic abutment capable of receiving various types of orthodontic components each having a different size of adhesive-bonding area, said orthodontic abutment comprising:

a unitary main body having a lower end with means for non-rotationally engaging said non-round fitting on said gingival surface of said implant, a supragingival end opposing said lower end for protruding above said overlying gingiva, and an outer surface between said lower end and said supragingival end, said outer surface including a roughened portion extending at least about 90° around a central axis of said main body for receiving said various types of said orthodontic components, said roughened portion extending from substantially said supragingival end to an intermediate position no closer than about 3 mm from said lower end, said roughened portion having an area that is larger than said adhesive-bonding area of at least one of said orthodontic components, said roughened portion of said outer surface for being in a fixed relationship with respect to said dental implant due to the cooperation of said non-round fitting and said non-rotational engaging means of said lower end; and means for securing said unitary body to said dental implant.

2. The orthodontic abutment of claim 1, wherein said outer surface is smooth from said intermediate position to said lower end.

3. The orthodontic abutment of claim 1, wherein said outer surface includes at least one flat area between said lower end and supragingival end such that a periphery of said unitary main body has a non-round shape when viewed in cross-section, said roughened portion being positioned outside of said at least one flat area.

4. The orthodontic abutment of claim 1, wherein said outer surface is cylindrical.

5. The orthodontic abutment of claim 4 wherein said roughened portion extends 360° around said central axis of said main body.

6. The orthodontic abutment of claim 1, wherein said securing means includes a screw.

7. The orthodontic abutment of claim 6, wherein said main body includes a through-bore for receiving said screw that secures said main body to said implant.

8. The orthodontic abutment of claim 1 in combination with an orthodontic component, wherein said orthodontic component is attached to said roughened portion of said outer surface along one segment of a 360° revolution around said central axis of said main body.

9. The orthodontic abutment of claim 1 in combination with an orthodontic component, wherein said orthodontic component is attached to said roughened portion of said outer surface along an entire 360° revolution around said central axis of said main body.

10. The orthodontic abutment of claim 1, wherein said roughened portion has a roughness in the range of about 700 to about 900 $\mu$-inch RMS.

11. The orthodontic abutment of claim 1, wherein said outer surface includes a smooth gingival portion for contact with said overlying gingiva, said gingival portion being adjacent to said lower end.

12. The orthodontic abutment of claim 11, wherein said gingival portion is adjacent to said roughened portion.

13. The orthodontic abutment of claim 11, wherein at least a segment of said gingival portion tapers outwardly from said lower end.

14. The orthondontic abutment of claim 1, wherein said body is modifiable by a clinician at chairside.

15. An orthodontic abutment for attachment to a dental implant that is embedded in a living jawbone having overlying gingiva, said implant having a non-round fitting that is accessible through said overlying gingiva, said orthodontic abutment capable of receiving an orthodontic component, said orthodontic abutment comprising:

a main metallic body having a lower end with means for engaging said non-round fitting of said implant, a supragingival end opposing said lower end for protruding above said overlying gingiva, and an outer surface between said lower end and said supragingival end, said outer surface including a smooth gingival portion extending from said lower end toward said supragingival end for at least about 3 mm, said outer surface further having a plasma-coated portion between said smooth gingival portion and said supragingival end; and means for securing said main body to said dental implant.

16. The orthodontic abutment of claim 15, wherein said plasma-coated portion extends from said supragingival end to an intermediate position between said lower end and said supragingival end.

17. The orthodontic abutment of claim 15, wherein said main body is made of titanium and said plasma-coated portion is produced by plasma spraying titanium particles.

18. The orthodontic abutment of claim 17, wherein said titanium particles have a size of about −80+200.

19. The orthodontic abutment of claim 17, wherein said titanium particles have a size greater than −60+100.

20. The orthodontic abutment of claim 17, wherein said plasma-coated portion is approximately 0.004 inch to about 0.006 inch in thickness.

21. The orthodontic abutment of claim 15, wherein said plasma-coated surface extends 360° around said central axis of said main body.

22. The orthodontic abutment of claim 15, wherein said plasma-coated portion is spaced away from said supragingival end.

23. The orthodontic abutment of claim 15, wherein said plasma-coated portion has a roughness greater than about 700 $\mu$-inch RMS.

24. The orthodontic abutment of claim 23, wherein said roughness is less than about 900 $\mu$-inch RMS.

25. The orthodontic abutment of claim 15, wherein said plasma-coated portion includes a plasma layer that is attached to said main body with a bonding strength in the range from about 7,000 psi to about 10,000 psi.

26. The orthondontic abutment of claim 15, wherein said body is modifiable by a clinician at chairside.

27. A method for providing an orthodontic anchor in a mouth comprising the steps of:

installing a dental implant in a jawbone of said mouth where said orthodontic anchor is needed;

allowing said implant to osseointegrate with said jawbone;

providing a unitary orthodontic abutment having an integal outer surface with a roughened portion extending entirely around said outer surface;

installing said orthodontic abutment on said implant in a manner which retains said roughened portion of said outer surface in a fixed position relative to said dental implant; and attaching an orthodontic component to said roughened portion of said orthodontic abutment with an adhesive compound.

28. The method of claim 27, further including the step of removing a portion of said orthodontic component to ensure a proper bite.

29. The method of claim 27, wherein said step of attaching an orthodontic component occurs after said step of installing said orthodontic abutment so that said compound is applied in said mouth.

30. The method of claim 27, wherein said step of attaching an orthodontic component precedes said step of installing said orthodontic abutment so that said compound is applied outside said mouth.

31. An orthodontic abutment for attachment to a dental implant that is embedded living jawbone having overlying gingiva, said implant having a gingival surface exposed through said overlying gingiva, said orthodontic abutment capable of receiving an orthodontic component, said orthodontic abutment comprising:

a generally cylindrical main body having a lower end for engaging said gingival surface of said implant and a supragingival end opposing said lower end for protruding above said overlying gingiva, said lower end including a non-rotational fitting to be mated with a corresponding non-rotational fitting on said implant, said main body further including a through-bore for receiving a screw that secures said main body to said implant; and an outer surface between said lower end and said supragingival end, said outer surface including a plasma-coated portion to which said orthodontic component is to be attached and a gingival portion for contacting said overlying gingiva, said gingival portion extending from said lower end for about 3 mm, said plasma-coated portion extending 360° around a central axis of said main body and being adjacent to said supragingival end, said plasma-coated portion being from approximately 0.004 inch to approximately 0.006 inch in thickness.

32. The orthondontic abutment of claim 31, wherein said body is modifiable by a clinician at chairside.

33. An orthodontic abutment for attachment to a dental implant that is embedded in living jawbone having overlying gingiva, said implant having a gingival surface with a non-round fitting that is accessible through said overlying gingiva, said orthodontic abutment being capable of receiving an orthodontic component, said orthodontic abutment comprising:

a unitary titanium main body having a lower end with a fitting for non-rotationally engaging said non-round fitting on said gingival surface of said implant and a supragingival end opposing said lower end for protruding above said overlying gingiva;

an outer surface between said lower end and said supragingival end, said outer surface including a roughened portion extending at least about 90° around a central axis of said main body, said roughened portion being adjacent to said supragingival end and at least about 3 mm from the lower end, said roughened portion having a roughness of greater than 700 $\mu$-inch RMS, said outer surface further having a smooth gingival portion for contacting said overlying gingiva; and means for securing said unitary body to said dental implant.

34. The orthodontic abutment of claim 33, wherein said roughened surface is a plasma-coated surface.

35. The orthondontic abutment of claim 32, wherein said body is modifiable by a clinician at chairside.

36. An orthodontic abutment for attachment to a dental implant installed in living jawbone having overlying gingiva, said implant having a first non-round fitting, said orthodontic abutment comprising:

a lower end;

a second non-round fitting adjacent to said lower end for mating with said first non-round fitting of said implant;

a supragingival end opposing said lower end for protruding beyond said overlying gingiva;

an outer surface between said lower end and said supragingival end, said outer surface including a roughened portion extending at least about 90° around a central axis of said orthodontic abutment, said roughened portion extending from substantially said supragingival end to an intermediate position on said outer surface no closer than about 3 mm from said lower end, said roughened surface being in a fixed relationship with respect to said second non-round fitting; and means for securing said unitary body to said dental implant.

37. The orthodontic abutment of claim 36, wherein said outer surface includes at least one flat area between said lower and supragingival ends, said roughened portion being positioned outside of said at least one flat area.

38. The orthodontic abutment of claim 36, wherein said outer surface is generally cylindrical.

39. The orthodontic abutment of claim 36, wherein said roughened portion extends 360° around said central axis of said main body.

40. The orthodontic abutment of claim 36, wherein said roughened portion has a roughness in the range of about 700 to about 900 $\mu$-inch RMS.

41. The orthodontic abutment of claim 36, wherein said outer surface includes a smooth gingival portion for contact with said overlying gingiva, said gingival portion being adjacent to said lower end.

42. The orthodontic abutment of claim 36, wherein said roughened portion is a plasma-coated surface.

* * * * *